219-121 SR
6/16/87 XR 4,673,792

United States Patent [19]

Gartland et al.

[11] Patent Number: 4,673,792

[45] Date of Patent: Jun. 16, 1987

[54] GAS-CONSTRICTED ARC NOZZLE

[75] Inventors: Thomas J. Gartland, Huntington Station; Adrian T. Papanide, Jackson Heights, both of N.Y.

[73] Assignee: Eutectic Corporation, Flushing, N.Y.

[21] Appl. No.: 824,525

[22] Filed: Jan. 31, 1986

[51] Int. Cl.[4] .................................................. B23K 9/00

[52] U.S. Cl. .................................... 219/74; 219/69 M; 219/121 PE; 219/69 R

[58] Field of Search ........................ 219/70, 137.42, 68, 219/69 R, 69 M, 72, 74, 75, 137.2, 137 R, 121 PP, 121 PS, 121 PE; 148/9.5, 9 R; 266/48

[56] References Cited

U.S. PATENT DOCUMENTS 3,839,618 10/1974 Muehlberger ............ 219/121 PP X
4,234,779 11/1980 Willems ........................ 219/121 PP
4,300,033 11/1981 Scarton et al. ........................ 219/70
4,385,941 5/1983 Daiker et al. ........................ 148/9.5

FOREIGN PATENT DOCUMENTS 33326 2/1983 Bulgaria .
10938 3/1971 Japan .................................... 266/48

*Primary Examiner*—E. A. Goldberg
*Assistant Examiner*—C. M. Sigda
*Attorney, Agent, or Firm*—Hopgood, Calimafde, Kalil, Blaustein & Judlowe

[57] ABSTRACT

An electric-arc discharge device includes an annular gas-flow nozzle surrounding the discharge electrode, the nozzle being configured for discharging gas flows at trans-sonic to supersonic velocity, with circumferential uniformity of the gas flow around the axis of the electrode, and directed downstream to surround and radially inwardly confine and shape the arc. The trans-sonic speeds of gas discharge are the result of special annular gas-nozzle design and suitable pressure of gas supply thereto, whereby a region of criticality characterizes gas flow within the nozzle, i.e., prior to discharge at trans-sonic speeds, the discharge being around the electrode and with such thrusting momentum as to establish shaping confinement and directional stability of the region of electric-arc development.

9 Claims, 5 Drawing Figures

GAS-CONSTRICTED ARC NOZZLE

BACKGROUND OF THE INVENTION

The invention relates to gas flow in aid of the arc discharge of an electric-arc discharge device, wherein the arc discharge is established to a workpiece which is electrically conductive.

Cutting and gouging are common uses of electric-arc discharge devices. With some processes, to do a clean piece of work has been almost impossible due to accumulation of dross products on the workpiece. Efforts to avoid this problem have involved use of gas jets, variously arranged, depending upon the job to be done. For example, to gouge a channel on the exposed face of a workpiece, plural gas jets have been clustered beneath the electrode tip of the device, the jets being directed at the region of arc discharge to the workpiece, all in the hope and expectation of removing a maximum quantity of arc-melted metal. However, as a practical matter, whether the plural jets are clustered beneath the electrode, or circumferentially distributed around the electrode, as in Bulgarian Patent No. 51,405, published Feb. 15, 1983, the arc discharge is noisy and the worked product is encumbered by dross which includes hardened droplets of melt of workpiece material, strongly adhered to the workpiece, or excessive fuming is encountered. And this is so even when operating the torch with a consumable, automatically fed electrode, whereby to enhance the ability to develop thermal energy at the point of arc delivery to the workpiece; a discussion of such consumable electrodes is contained in pending patent applications Ser. Nos. 780,031 and 780,033, filed Sept. 25, 1985.

BRIEF STATEMENT OF THE INVENTION

It is an object of the invention to provide a new and improved method and means for utilizing gas flow to shape and position the discharge of an electric arc.

A specific object is to realize the above object in a manner to establish relatively quiet and stable arc action, while accumulating next to no dross, and with much-reduced fuming, as compared with prior techniques.

Another specific object is to realize the above objects while at the same time enabling adjustably controllable constriction of the arc, at far greater offset from the gas nozzle than has hitherto been possible, to thereby provide better visible access for viewing arc action on the workpiece.

A further specific object is to provide a nozzle configuration of general utility in application to an electric-arc discharge device whereby the same nozzle can serve for realizing the above objects, for a variety of operations, including sheet-metal cutting and workpiece gouging.

A general object is to achieve the foregoing objects with a construction enabling much faster and more efficient electric-arc discharge operations, while also substantially extending the limits within which electric-arc discharge operations are feasible.

The invention achieves the foregoing objects in an electric-arc discharge device wherein an annular nozzle surrounds the electrode and is configured for discharging gas flows at trans-sonic speeds, with circumferential uniformity of the gas flow around the axis of the electrode, and directed downstream to surround and radially inwardly confine and shape the arc. The trans-sonic speeds of gas discharge are the result of special annular gas-nozzle design and suitable pressure of gas supply thereto, whereby a region of criticality characterizes gas flow within the nozzle, i.e., prior to discharge at trans-sonic speeds, which are to be taken to range from high subsonic to relatively low supersonic, at discharge around the electrode and toward the region of electric-arc development.

In a particularly advantageous general-purpose embodiment of the invention, means are provided for additionally developing a further annulus of discharged gas flow, concentrically around the trans-sonic velocity flow and in the same axial direction, but at lesser gas-flow rate, whereby pressure of arc-confining gas flow can be controlled in surrounding adjacency to the electrode and its arc, and whereby the action of atmospheric pressure on the trans-sonic annular flow can be buffered by said further annulus of gas flow.

DETAILED DESCRIPTION

The invention will be illustratively described in detail for several embodiments, in conjunction with the accompanying drawings, in which.

Figures 1, 2:
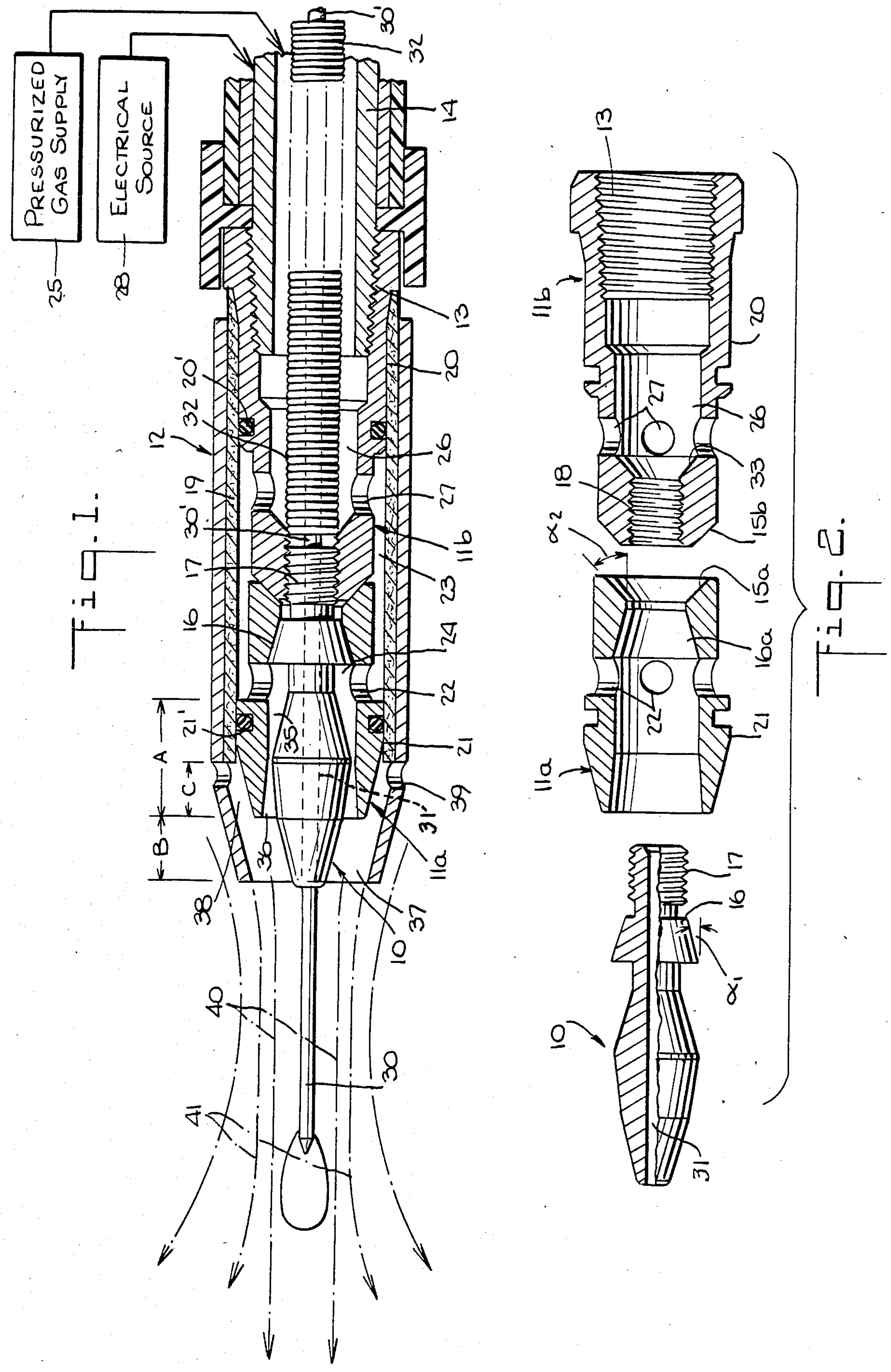
FIG. 1 is a view in longitudinal section through an electrode nozzle of presently preferred configuration for general purpose use.
FIG. 2 is an exploded view in longitudinal section of three internal components of the configuration of FIG. 1.

The electrode-nozzle construction of FIG. 1 comprises an electrode member 10, a two-part body member **11*a*–11*b*, and a shroud member 12 in mutually supported concentric relation about a central axis which extends from an upstream end to a downstream end of the nozzle. The body member is tubular and has internal threads 13 at its upstream end for connection to the outlet 14 of a host torch. The body member is also configurated for removable support of the upstream end of electrode member 10**, whereby the downstream remainder of the electrode member derives cantilevered support from the body member over at least an axially downstream nozzle region A of circumferentially continuous radially spaced overlap with the body member.

In the form shown, the body-member parts **11*a*–11*b* have complementary frusto-conical adjacent ends 15*a*–15*b*, the electrode member 10 and body part 11*a* have complementary frusto-conical formations 16–16*a*, and the electrode member 10 is threaded at its upstream end 17 for removable engagement to the threaded downstream end 18 of body part 11*b* whereby close tolerance of concentricity between lapped body-member and electrode-member surfaces is assured upon completion of the thread engagement at 17–18. In this connection, it is noted that the relatively gentle convergence angle $\alpha_1$ of conical surfaces 16–16*a*, compared to the steeper and opposite convergence angle $\alpha_2$ of conical surfaces 15*a*–15*b* enables relatively great torsional friction to develop at 16–16*a*, thereby facilitating disengagement of threads 17–18 upon relative rotation of the body-member parts 11a–11**b, i.e., without having to apply a tool of any kind to the electrode member.

The shroud member 12 is elongate and tubular and establishes an electrically insulated circumferential enclosure of the electrode and body members; member 12 may be a single piece of suitable molded plastic, but as shown it is a metal tube with a tubular liner 19 of insulating material such as a fiber-glass reinforced plastic. At its downstream end, shroud member 12 converges conically, in concentrically spaced relation with the downstream end of the body member and with the downstream end of the electrode member 10. Shroud-member support on the body member is via upstream and downstream lands 20–21 which are peripherally grooved for an elastomeric O-ring seal 20′–21′ of each land engagement. Between the lands 20–21, the body member is of reduced diameter to thereby define with shroud liner 19 an annular manifold 23 for gas-flow supply via plural radial ports 22 to a plenum 24 at the upstream end of the region A of spaced concentric overlap of electrode member 10 by the downstream end of the body member. A suitable supply 25 of pressurized gas is schematically shown to be connected to the host torch and to be fed via the outlet 14 to the upstream counterbore region 26 of the body member and then, via plural radial ports 27, to the manifold 23.

The host-torch outlet 14 will be understood to be electrically conductive and to be connected to an electrical source 28 of arc-supply power. Both parts of the body member may also be conductive, suitably of brass, and part 11b is the means of applying arc power to electrode member 10.

If the arc to be struck to a conductive workpiece (not shown) is to involve a non-consumable electrode, then electrode member 10 may be internally configured for releasably chucked retention of a suitable electrode rod, projecting at substantial downstream offset beyond electrode member 10, as shown for the projecting rod end 30 in FIG. 1; alternatively, the electrode member 10 may be of suitable high-temperature alloy and integrally formed with a forwardly projecting tip end from which the arc is to be struck. In the form shown, however, electrode member 10 is suitably of copper, with a continuous central bore 31 for forwardly cantilevered support of a consumable electrode rod or tube, as of the nature disclosed in said pending patent applications, in which case the numeral 30 will be understood to identify the visibly exposed end of the electrode rod or tube; in this event, rod 30 will be understood to be continuously fed from the host torch, being shown at 30′ to be continuously guided within a Bowden-wire flexible sheath 32 which derives central piloting support via the concave axially inner-end wall 33 of body-member cavity 26.

It is an important feature of the invention that, within the nozzle region A, axially lapped concentric surfaces of the electrode member and of the body member coact to define an annular supersonic nozzle which is characterized by a circumferentially continuous annular throat at the constricted downstream end of a zone 35 of convergence from plenum 24, the convergence being such, in conjunction with the gas-flow rate and pressure available from supply 25, that critical flow is established at the throat; generally involved supersonic velocities are in the range Mach 1 to Mach 3. As shown, the circumferentially continuous condition is also maintained in a diffuser zone 36 wherein gas velocity increases for discharge at trans-sonic or supersonic velocity into the larger annulus 37 of axial extent B, where the downstream end of the shroud member 12 laps only the downstream convergent end of the electrode member 10. This supersonic-nozzle discharge is in part relied upon, within the annulus 37, to induce a substantial and further gas flow in an annular convergent-passage zone 38, of axial extent C, defined by and between the convex downstream-end taper of the body member and the concave inner-wall taper of the downstream end of shroud member 12. Gas supply to the passage zone may be a suitably regulated pick-off from source 25, or from another gas source, but as shown plural arcuate ports 39 afford induction of ambient air as the gas flow in zone 38.

The net effect and result of the described configuration of FIGS. 1 and 2 is to establish two concentric annular flows at nozzle discharge. The greatest velocity, and therefore lowest pressure, characterizes an inner annulus bounded by the projecting electrode end and by a generally cylindrical margin 40 of adjacency to an outer annulus (within an outer margin suggested at 41) of induced second flow of substantial velocity, which is less than the velocity within the inner annulus 40. Since this second annulus of induced gas flow is of lesser velocity, it must be characterized by pressure which is intermediate near-ambient pressure (at margin 41) and the much lower pressure within annulus 40. Thus, for any transverse section taken along and beyond the projected extent of electrode 30, a substantial and circumferentially uniformly distributed radially compressing pressure gradient exists. This gradient is found to be so circumferentially uniform and strong as to dictate the focus and sectional width of the arc itself, rendering the FIG. 1 configuration useful to gouge or to cut a given workpiece, for the circumstance of compressed air from supply 25, merely by varying the feed-air pressure, the wire (30) feed rate (amperage) and the arc voltage.

Figure 3:
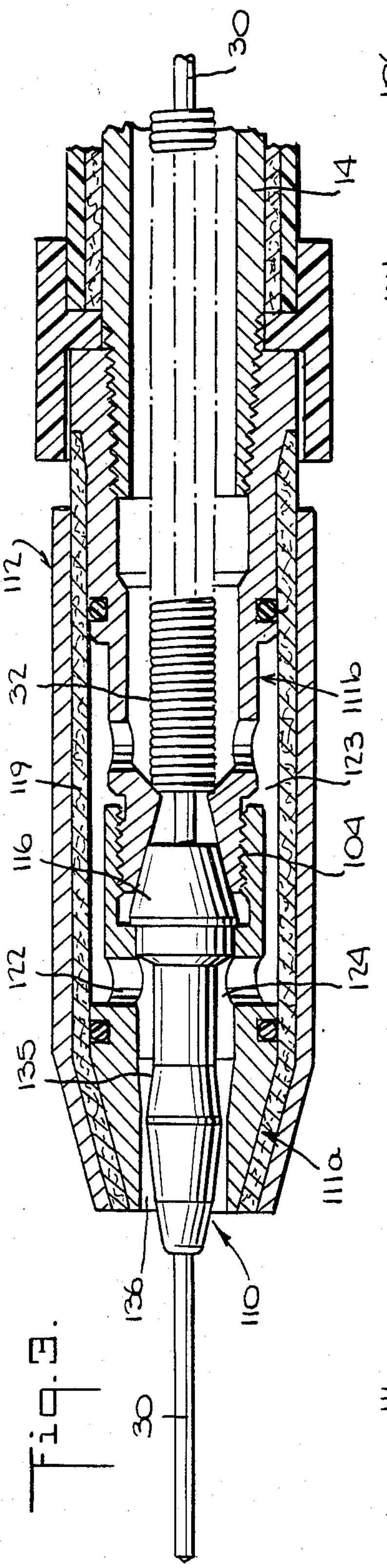
FIG. 3 is a view similar to FIG. 1, for a different embodiment, presently preferred for essentially a single-purpose use.
Figure 4:
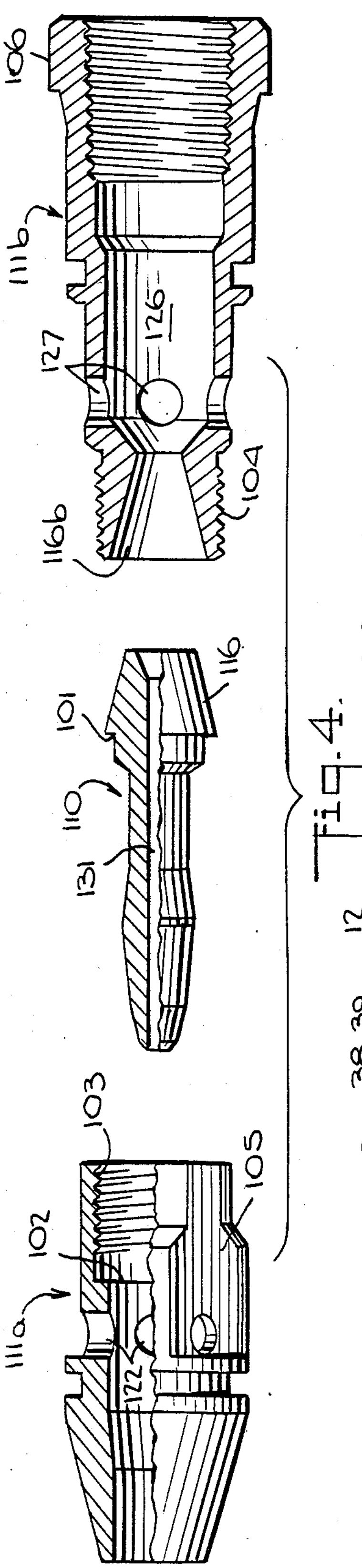
FIG. 4 is a view similar to FIG. 2, for the corresponding three internal components of the configuration of FIG. 3.

The nozzle configuration of FIGS. 3 and 4 is preferred for the single-purpose application of cutting a sheet-metal workpiece, as when delineating a locally damaged vehicle-body panel area for removal and replacement. FIGS. 3 and 4 also illustrate an alternative technique for removably mounting an electrode member 110 to a body member, which again comprises two parts 111a–111b. simplicity of description, parts of the electrode nozzle of FIGS. 3 and 4 which correspond to those of FIGS. 1 and 2 are identified by the same reference numbers, in a 100-series.

In terms of the FIGS. 3/4 alternative mounting of electrode member 110, the upstream end thereof is characterized by a radial shoulder 101 at the base end of a frusto-conical mounting head 116, which derives coaxial positioning reference from a complementary concave frusto-conical seating surface 116b in body-member part 111b. To retain the seated relation, the bore of body-member part 111a is characterized by a radially inward shoulder 102 which axially drives head 116 into seated position, upon relative rotation of parts 111a–111b to advance their threaded engagement at 103–104. Flats 105 on part 111a and on the flanged end 106 of part 111b will be understood to facilitate wrenched fastening and release of the seated relation of head 116.

For the primarily cutting purpose to be served by the nozzle electrode of FIGS. 3 and 4, it is preferred to characterize the supersonic-nozzle region so that, beyond the critical-flow region at the throat, and in the expanding zone 136, the mean radius of supersonic flow is convergent in the downstream direction. This convergence, in the context of elevated pressure of gas-flow supply to the plenum for the annular supersonic nozzle, is found to provide such strong and well-focused delivery of supersonic flow along an annulus closely adjacent the consumable electrode 30, for at least as much axial distance as 5 times the mean exit diameter of zone 136, as to require no additional pinch-control effect from any other annular flow. The downstream end of shroud member 112 of FIG. 3 therefore is for protection purposes only, in that no flow can be induced therein, beyond the supersonic discharge from zone 136. And the radially compressed arc struck from this nozzle provides a very stable and narrow path of line-cutting of a metal workpiece.

Figure 5:
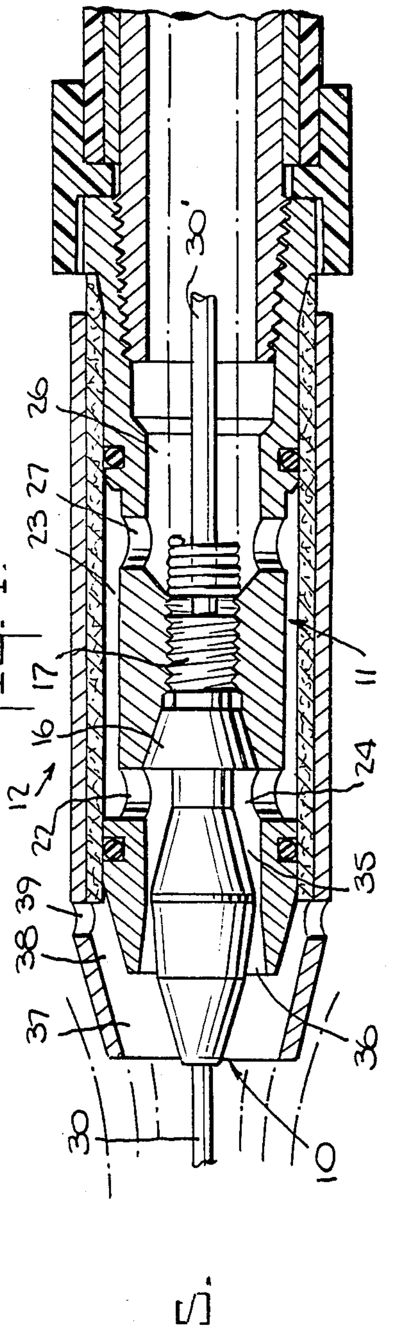
FIG. 5 is a fragmentary view in longitudinal section, to show an alternative construction.

The embodiment of FIG. 5 provides all the performance features of FIGS. 1 and 2, and is solely illustrative of the employment of a onepiece body member 11, which is counterbored from its downstream end to match the taper of the frusto-conical seating surface of electrode member 10, and which is suitably tapped for threaded reception of the upstream end 17 of the electrode member 10.

Illustrative dimensions will be given for the convergent/divergent zones of the supersonic-nozzle portions of the respective embodiments of FIGS. 1 (5) and 3, for the case of connection to a host-torch output bore of 0.75-in. diameter, a shroud-member diameter of 0.875 inch, and an assembled electrode-nozzle length of 3 inches, within which the annular supersonic-nozzle portion is of 0.50-inch axial length, i.e., the overall length (A) spanned by ends of its zones 35 and 36. In the configuration of FIGS. 1 and 5, the throat is at the half-way point, and the zone 35 is defined by a 0.375-in. diameter cylindrical bore in part 11*a*, and by a convex frusto-conical surface (of electrode member 10) which slopes at 15° from the longitudinal axis, to a maximum diameter which establishes a 0.012-inch, circumferentially continuous annular clearance at the throat; the mean slope of the convergent zone 35 is thus an expanding cone of 7.5° slope. Downstream from the throat, the bore in part 11*a* slopes outward at 5°, and the lapped convex frusto-conical surface of electrode member 10 slopes at substantially 6°, so that the mean slope of the divergent zone 36 is a very slightly converging cone. At its point of discharge into the zone 37 of inducing further gas flow from passage 38, the discharge area from zone 36 is preferably in the range 1:1 to 1:5 as compared to the area of passage 38 at entry into zone 37.

In an illustrative case of the primarily cutting embodiment of FIG. 3, the overall length of the annular supersonic-nozzle configuration is again 0.50 inch, but the bore at the throat is of 0.281-in. diameter, the same being located on the upstream side of the mid-point so as to provide a convergent zone 135 of 0.18-in. length and a divergent zone 136 of 0.32-in. length. The convergent zone 135 is characterized by virtually zero mean slope, but the divergent zone is characterized by a mean slope which converges at 2.5° in the downstream direction, whereby to achieve greater confinement of its supersonic-flow discharge along the electrode 30 and in radial compression of the arc struck therefrom.

The described configurations will be seen to achieve the stated objects. Although instrumentation has not been available to make exact measurement of flow speeds, it can be said that the supersonic nozzle of the FIG. 1 configuration is designed theoretically to produce an exit velocity of Mach 2.63 with as low as 5-psi pressure differential over the axial span A of the supersonic-nozzle region of zones 35 and 36. The induced-flow nozzle is configured to employ like opposed concave and convex slopes to establish an induced-flow passage of section area which converges along a single outer confining surface, from its largest area at ambient-air entry, to the inside pocket which characterizes zone 37. This enables the induced-air flow to enter zone 37 in coaxial relation to the greater speed of discharge flow from the supersonic nozzle. The converging subsonic coaxial flow of the induced air coacts with the convergent tip of the electrode member 10 (reducing to the diameter of the electrode wire 30) to restrain deceleration of the higher-velocity flow from the supersonic nozzle, while drawing the higher-velocity flow smoothly down to the electrode wire 30. The induced-air flow provides a protective or sacrificial coaxial sheath of high-speed flow which reduces or moderates the compressive effects of atmospheric air on the primary flow; it also delays, and therefore axially offsets beyond the torch, the flow-degrading effect of turbulence. A side benefit is that overall air flow is increased without need for additional high-pressure air; indeed, the result is a lesser volumetric demand for high-pressure air flow. In tests to date, the FIG. 1 (5) configuration has provided easily variable thrust compression of the arc, by varying air-feed pressure at 25. The resulting electric arc is quiet and stable, producing uniform displacement of melted workpiece metal, with reduced fuming (because most displaced melted metal is not atomized), and with little or no adhering dross. The reduced feed-air volume requirement is accompanied by superior control of gouging and cutting operations, it being possible to control the degree of arc-thrust constriction, and therefore width of the arc, over a 10:1 range of pressures (10 psi to 100 psi) as delivered by the source 25.

What is claimed is:

1. The method of focusing the shape of an electric-arc discharge on an axis from a discharge end of an electrode to a conductive workpiece, which method comprises developing a circumferentially uniformly confined and distributed and axially-downstream directed gas flow in concentric radial proximity to the electrode, said gas flow being discharged at a velocity in the trans-sonic range and at a location upstream from the discharge end of the electrode, and said gas flow being so substantial as to provide a circumferentially continuous annular shaping-confinement of the arc beyond the discharge end of the electrode.

2. The method of claim 1, in which the electrode is consumable and is continuously elongate upstream from the discharge end, the electrode being continuously fed in the direction of the axis of discharge and at a rate which maintains the discharge end of the electrode at a location downstream from the location of trans-sonic gas-flow discharge.

3. The method of claim 1, in which said trans-sonic gas-flow discharge is produced by first developing a circumferentially uniformly distributed confined annulus of axial flow at supersonic velocity prior to discharge.

4. The method of claim 3, in which the workpiece is a metal object to be cut, and in which the supersonic velocity is in the range Mach 1 to Mach 3.

5. The method of claim 1, wherein said gas flow is the first of two gas flows, and the further step of developing a second circumferentially uniformly confined and distributed and axially-downstream directed gas flow in concentric radial proximity to said first gas flow, the confinement being in axial overlap with the discharge of the first gas flow, and said second gas flow being discharged at a velocity less than said first gas flow and at a second location which is downstream from the discharge of said first gas flow and which is upstream from the discharge end of the electrode.

6. The method of focusing the shape of an electric-arc discharge on an axis from a discharge end of an electrode to a conductive workpiece, which method comprises developing a circumferentially uniformly confined and distributed and axially-downstream directed gas flow in concentric radial proximity to the electrode, establishing within said confinement a region of critical gas flow, and discharging said gas flow at a location upstream from the discharge end of said electrode, whereby trans-sonic velocity characterizes flow discharge from said region, and said gas flow being so substantial as to provide a circumferentially continuous annular shaping-confinement of the arc beyond the discharge end of the electrode.

7. The method of focusing the shape of an electric-arc discharge on an axis from a discharge end of an electrode to a conductive workpiece, which method comprises developing a circumferentially uniformly confined and distributed and axially-downstream directed first gas flow in concentric radial proximity to the electrode, said first gas flow being discharged at a velocity in the trans-sonic range and at a location upstream from the discharge end of the electrode, and using said first gas flow to develop by induction a second circumferentially uniformly confined and distributed and axially-downstream directed gas flow in concentric radial proximity to said first gas flow, the confinement of said second gas flow being in axial overlap with the discharge of said first gas flow, said second gas flow being discharged at a velocity less than said first gas flow and at a second location which is downstream from the discharge of said first gas flow and which is upstream from the discharge end of the electrode, and said first gas flow being so substantial as with the aid of said second gas flow to provide a circumferentially continuous annular shaping confinement of the arc beyond the discharge end of the electrode.

8. The method of claim 7, in which the second gas flow is induced from ambient air.

9. The method of focusing the shape of an electric-arc discharge on an axis from a discharge end of an elongate electrode to a conductive workpiece, which method comprises supporting the electrode at an axial location beyond which the discharge end is a cantilevered projection, and developing a circumferentially uniformly confined and distributed and axially-downstream directed gas flow in concentric radial proximity to the electrode, said gas flow being discharged at a velocity in the trans-sonic range and at a location upstream from the entire cantilevered projection of said elongate electrode, and said gas flow being so substantial as to provide a circumferentially continuous annular shaping-confinement of the arc beyond the discharge end of the electrode.

* * * * *